C. W. SLEEPER.
CAN MAKING MACHINE.
APPLICATION FILED JAN. 17, 1908.

1,019,376.

Patented Mar. 5, 1912.
3 SHEETS—SHEET 1.

Witnesses.

Inventor.
Charles W. Sleeper
by his Atty.

C. W. SLEEPER.
CAN MAKING MACHINE.
APPLICATION FILED JAN. 17, 1908.
1,019,376.
Patented Mar. 5, 1912.
3 SHEETS—SHEET 2.
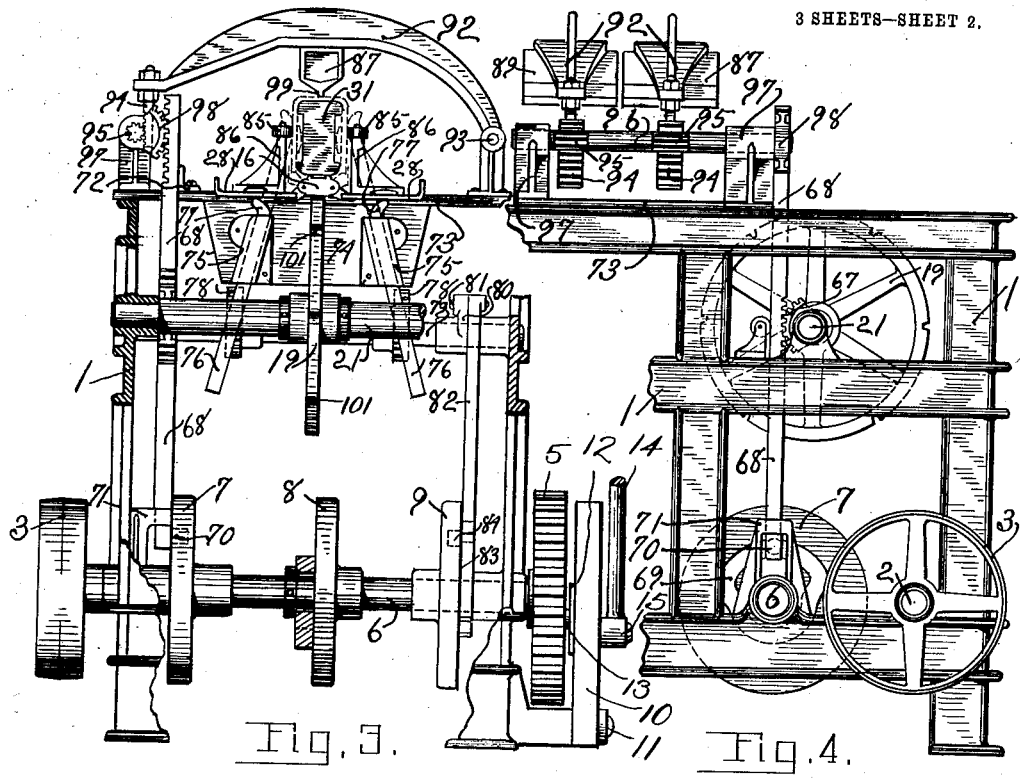
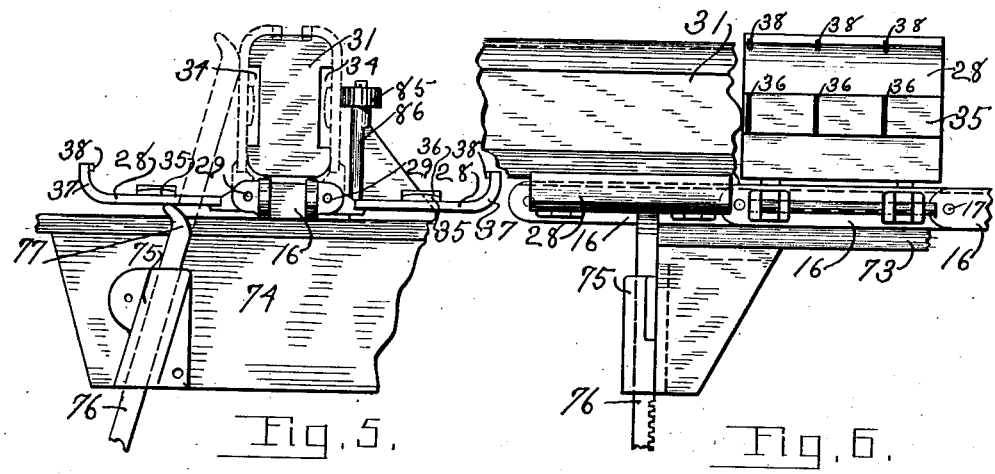

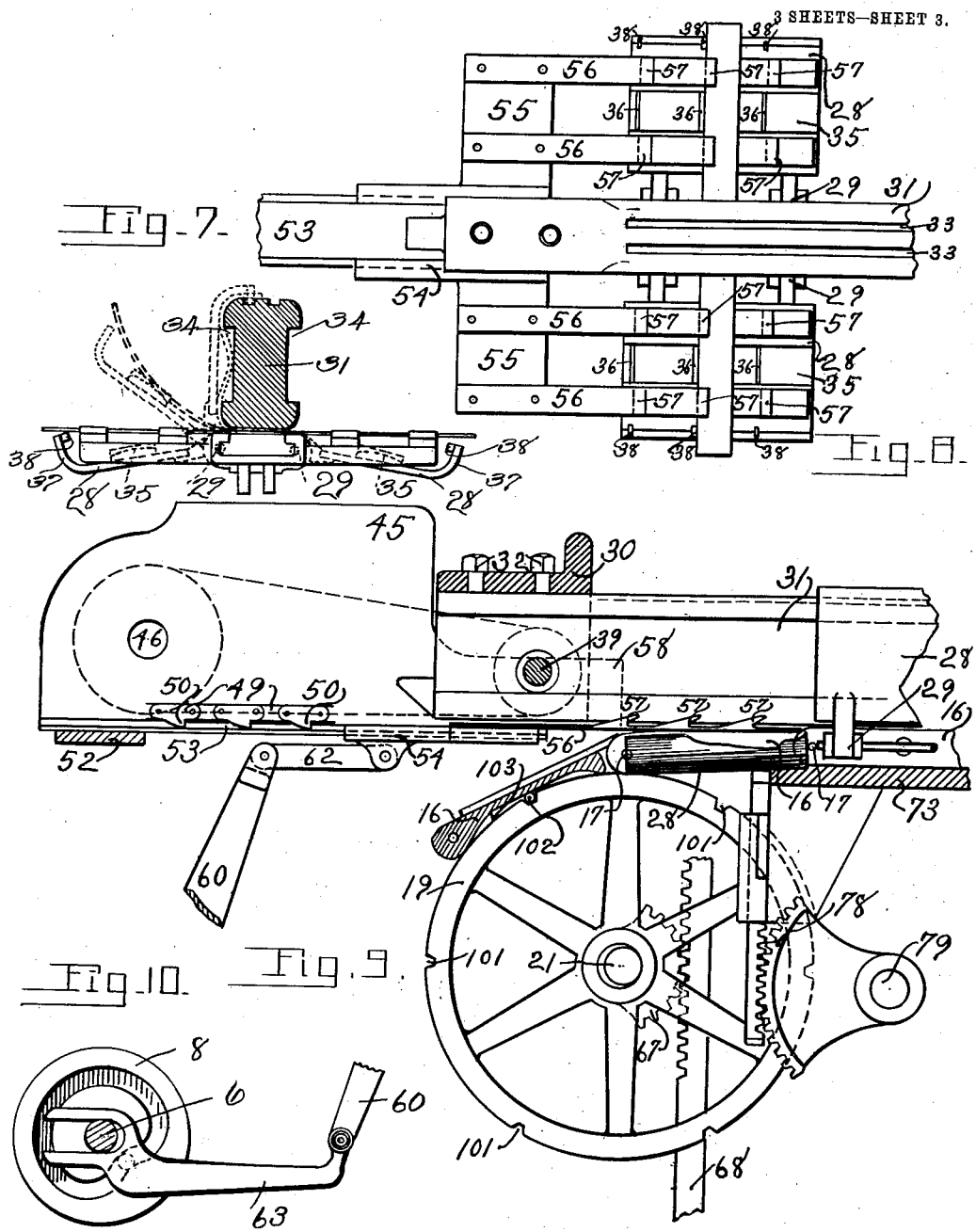

UNITED STATES PATENT OFFICE.

CHARLES W. SLEEPER, OF LANCASTER, NEW HAMPSHIRE.

CAN-MAKING MACHINE.

1,019,376.  Specification of Letters Patent.  Patented Mar. 5, 1912.

Application filed January 17, 1908. Serial No. 411,300.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Can-Making Machines, of which the following is a description, reference being had to the accompanying drawings, forming a part hereof.

My invention relates to can making machines of the type designed to form and solder the bodies of tin cans; and it has particular reference to a machine designed to form and solder can bodies such as are in use for packing sardines, in which the depth of the can is slight as compared with its area, the can body being as a consequence quite narrow.
With the above in view, my invention consists in the can making machine illustrated in the accompanying drawings, described in the following specification, and specifically claimed in the clauses of the concluding claim; and in the various subordinate and auxiliary features of such a machine which I have also claimed by themselves.

Figure 1:
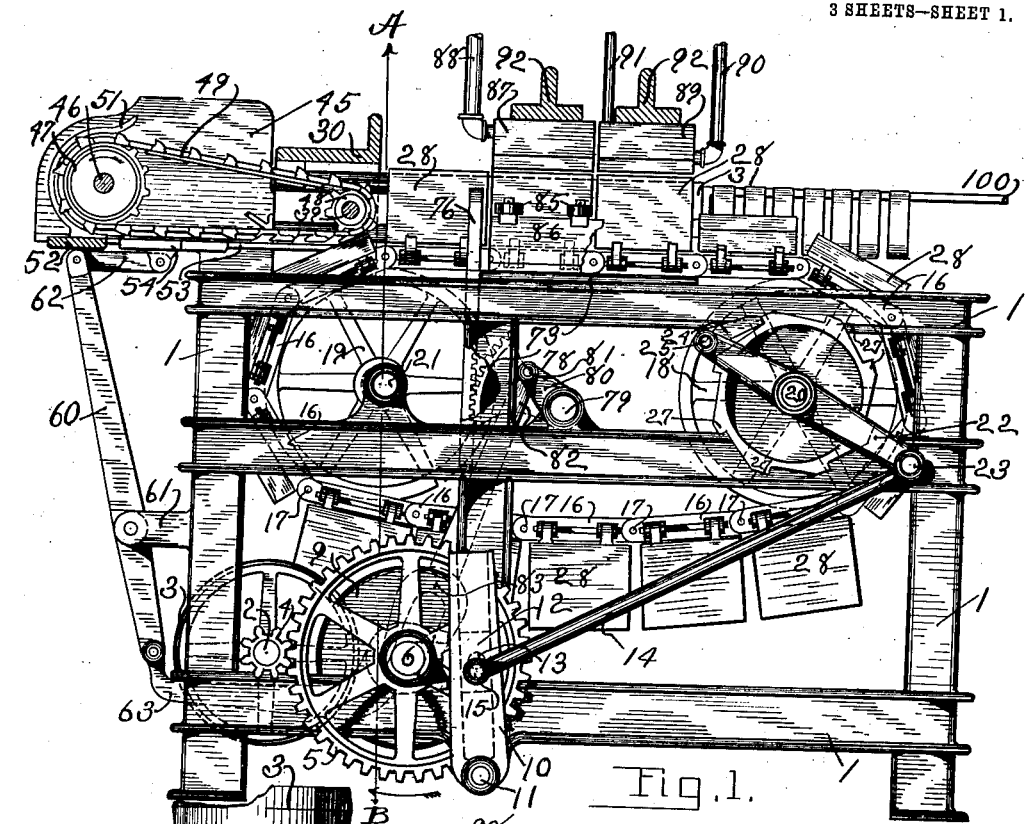
Figure 2:
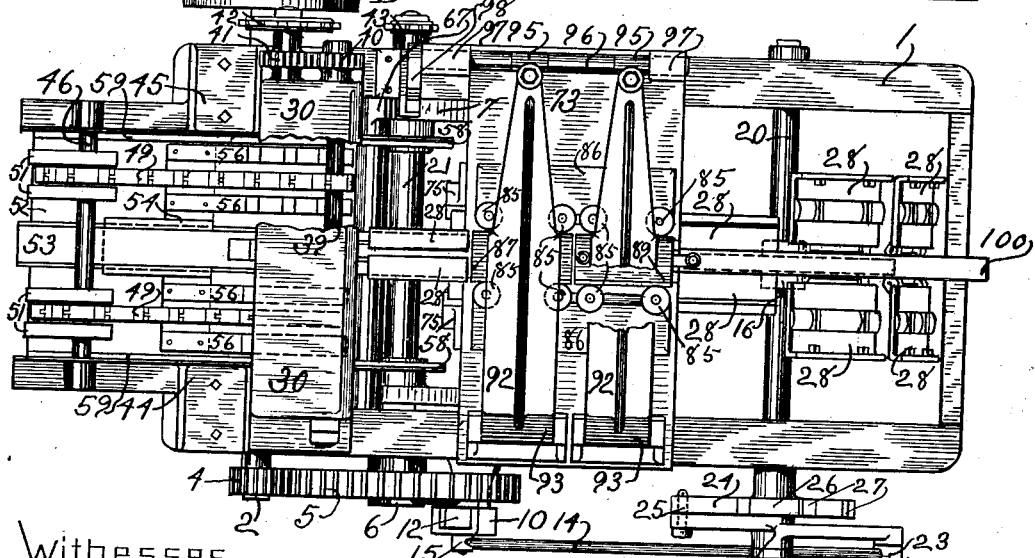

In the accompanying drawings: Figure 1 is a view showing my improved machine in elevation, some of the parts being broken away to better illustrate the operation thereof, Fig. 2 is a view showing my machine in plan, some of the parts being broken away, Fig. 3 is a view as seen from the left and taken on the line A—B of Fig. 1, many of the parts however being omitted as this view is intended to illustrate certain features only, Fig. 4 is a fragmentary view illustrating details of my machine as seen from a point behind the machine as shown in Fig. 1, or from the left hand side of Fig. 3. Figs. 5 and 6 are fragmentary views in front and side elevation illustrating bending mechanism hereinafter described. Figs. 7 and 8 are views illustrating the operation of mechanism for feeding can body blanks to the bending mechanism shown in Figs. 5 and 6, Fig. 7 incidently showing said bending mechanism and illustrating its operation, Fig. 9 is a fragmentary view illustrating features of operation of my machine, and, Fig. 10 is a view illustrating the cam and coöperating elements for operating the blank feeding mechanism above referred to.

The various operative elements of my can making machine are supported by a suitable frame 1, and power is applied thereto by means of a drive shaft 2 having a pulley 3.
4 is a pinion upon the drive shaft 2, and meshing with a gear 5 upon a cam shaft 6, upon which shaft are three cam disks 7, 8, and 9, Fig. 3, having suitable cam races to be hereinafter more fully described.

10 is a slotted arm fulcrumed to the frame of the machine at 11, and 12 is a slide block adapted to slide in the slot of the arm 10 and with which a pin 13 carried by the gear 5 engages, so that as the shaft 6 rotates the arm 10 will be swung upon the fulcrum at 11 by means of the pin 13 and slide block 12. The mechanism above described will be recognized as a somewhat common form of quick return mechanism.

14 is a pitman pivoted to the slotted arm 10 at 15, and through which intermittent movement is transmitted to an endless carrier upon which are located mechanisms for forming the can bodies produced in the operation of my device.

The carrier above referred to comprises a series of links 16 secured together by pins at 17 and forming an endless chain or carrier, which carrier passes around wheels 18 and 19 similar in function and operation to ordinary sprocket wheels. The wheel 18 is the driving wheel by which the carrier is operated, and is carried by an ordinary shaft 20 supported by suitable bearings in the frame of the machine. The wheel 19 is mounted so as to turn freely upon a shaft 21 of peculiar construction and to be hereinafter more fully disclosed.

Intermittent motion is communicated to the above mentioned carrier from the pitman 14 as follows: 22 is an oscillating arm loosely mounted and movable upon an extension of the shaft 20, and with which the pitman 14 is pivotally connected at 23. The arm 22 carries a pawl 24 pivoted at 25, and 26 is a ratchet fast upon the shaft 20 and having a series of teeth 27 with which the pawl 24 engages as the arm 22 is oscillated, from which it will be seen that the endless carrier above referred to will be driven intermittently in a series of step by step movements during the operation of the machine. Each of the links 16 of the endless carrier is provided with a pair of folding bending wings 28 hinged to the said links at 29 and adapted to travel therewith.

30 is a yoke extending across the frame of the machine and which serves as a support for a forming horn 31 about which the can bodies are bent, one end of said horn being secured to the yoke by bolts 32 and the other end thereof being unsupported, and said horn is of sufficient length to extend and support the can bodies during the bending and the soldering operations hereinafter disclosed. This horn is provided with two longitudinally extending grooves 33 in its upper surface, and with a longitudinally extending depression 34 upon either side.

The bending wings 28 are provided with cheek pieces 35 so located thereon that they will enter the depression 34 of the horn 31 when the said wings are folded about the horn, as seen in Figs. 5 and 7, and each of said cheek pieces is provided with a series of projecting spurs 36, each wing being shown as provided with three such spurs for the purpose of enabling each wing to operate upon three can body blanks at one time. The free ends of said wings are curved as at 37, Figs. 5 and 7, and are provided at their extremities with a series of spurs 38 corresponding in number to the spurs 36. The purpose of the spurs 36 and 38 is to engage the edge of can body blanks to move them through the machine, during which movement the said spurs respectively pass along the depression 34 and the grooves 33 formed in the horn 31.

As the endless carrier passes upward around the sprocket wheel 19 the folding wings 28 open by gravity and assume a substantially horizontal position as will be understood from Figs. 5, 7 and 8. While the said wings are in this condition, and while they occupy a position substantially as shown in Fig. 9 above the shaft 21 carrying the sprocket wheel 19, a plurality of can body blanks, three in the machine as illustrated, is fed or supplied to each pair of wings by feeding mechanism constructed and operating as follows: 39 is a shaft supported in suitable bearings carried by the yoke 30, and 40 is a gear fast upon said shaft. 41 is a second gear in engagement with the gear 40, and 42 is a sprocket wheel connected rigidly with the gear 41 and adapted to drive said gear. The sprocket wheel 42 and gear 41 run loosely upon a stud carried by the yoke 30. The sprocket wheel 42 is driven from a second sprocket wheel 43 upon the end of the cam shaft 6 by a suitable sprocket chain not shown; whereby motion is transmitted to the shaft 39 through the train of gearing above described.

44 and 45 are two sides of a feed box secured to the frame of the machine, and 46 is a shaft supported in suitable bearings in the sides 44 and 45 and upon which sprocket wheels 47 are carried.

48 are sprocket wheels carried by the shaft 39, and 49, 49 are sprocket chains passing around the above mentioned sprocket wheels. These sprocket chains include links having projections 50, as shown in Fig. 9, adapted to engage can body blanks and feed them to the machine.

51 are a series of guides located adjacent the sprocket wheels 47 for the purpose of preventing the blanks from falling from the chains as they are carried from the upper to the lower runs of the chains.

52 is a cross piece connecting the ends of the side members 44 and 45, and 53 is a guide bar secured to the central portion of said cross piece and extending to a point beneath the yoke 30.

54 is a slide or cross-head having extensions 55 and adapted to move upon and be guided by the guide bar 53, and 56 are a series of four feed members secured to the extensions 55 as shown most clearly in Figs. 8 and 9 of the drawings. Each of the said feed members 56 is provided with a series of hook-like projections 57.

The sides 44 and 45 of the feed box are provided with extending portions 58, Figs. 2 and 9, and the lower edges of said sides and extensions are provided with a projecting ledge at 59 for the purpose of supporting and guiding the ends of the can body blanks as they are fed to the machine.

The cross-head 54 is given a reciprocating motion by means of an oscillating lever 60 supported at 61 and connected with said cross-head by means of a link 62, and the oscillating lever is operated by a reciprocating member 63. This member 63 see Fig. 10, is forked at its end as at 64 to engage the shaft 6, which shaft thereby keeps the end of said member in proper position; and said member is provided with a pin 65 which runs in a cam race 66 formed in the cam disk 8. The form of the cam race 66 is such that the cross head 64 will remain at rest for a considerable time in the position in which it is shown in Fig. 1, and will then be moved forward into the position shown in Figs. 8 and 9 and withdrawn during a comparatively brief interval of time.

The parts of the feed mechanism being in the position shown in Fig. 1, it is obvious that can body blanks placed upon the upper run of the sprocket chains 49 will be engaged by the projections 50 of the links thereof and carried around the sprocket wheels 47 and along the lower run of the said chains, the ends of the blanks engaging the ledges 59 and the middle portions resting upon the guide bar 53, to the right hand end of the lower run of said sprocket chains, which, it will be seen, terminates at a point beneath the end of the forming horn 31. The cross head 54 is now moved to the right, whereupon three blanks will be engaged by the hook-like projections 57 of the feed members 56 and moved from the sprocket chains and the supports upon which they rest to the right and along the under side of the horn 31 into a position directly above the pair of bending wings 28 which is to receive them, as will be understood from Figs. 8 and 9 in which the feed members 56 are shown in their extreme position to the right and with one can body blank resting upon them. The relative proportion of the various elements of the feed mechanism, and the sequence of their various operations, is such that the cross head 54 will be moved to the right each time that a group of three blanks has reached the right hand end of the lower run of the sprocket chains 49 to feed successive groups of three blanks to successive pairs of bending wings.

Means are provided for moving the sprocket wheel 19 in a vertical direction; and, the can body blanks having been carried as above into a position directly above a pair of bending wings 28, Figs. 8 and 9, the said wings are moved vertically; whereupon the blanks are caught between the upper surface of the link 16 carrying said wings and the lower surface of the forming horn 31 and pressed against the said horn, see Figs. 5 and 7. The purpose of this feature of operation is to permit the feed members 56 to be withdrawn without bringing the blanks with them, and the said members are now moved to the left, leaving the can body blanks resting upon a pair of bending wings 28, and clamped between the upper surface of a link 16 and the lower surface of the forming horn 31.

The means whereby vertical movement mentioned above is imparted to the sprocket wheel 19 is as follows: The shaft 21 upon which the said wheel is free to rotate is provided with eccentrically located bearings at its ends, as will be understood from Fig. 9, which are supported in suitable bearing boxes upon the frame of the machine. 67 is a geared sector secured upon an inward prolongation of one of the eccentrically located bearings of the shaft 21, and 68 is a rack bar in engagement with said sector as shown in Figs. 3, 4, and 9. Said rack bar is given a vertical reciprocation movement by means of the cam 7 having a race 69 with which a pin 70 upon the rack bar 68 engages. The said rack bar is guided by a guide 71 secured to the frame of the machine and by a second guide 72 at its upper end. With the parts above described in the position shown in Figs. 3, 4 and 9 it will be obvious that a downward movement of the rack bar 68 will turn the shaft 21 upon its eccentrically located bearings and produce an upward movement of the sprocket wheel 19 and the links 16 of the movable carrier which may then be at the top of said wheel.

73 is a table secured to and extending across the top of the machine beneath the forming horn 31, and 74 is an apron depending from one end of said table. 75 are two guides secured to said apron and adapted to guide a pair of inclined racks 76 having cam faces 77 at their upper ends adapted to engage and operate the folding wings 28. The inclined racks 76 are operated by two geared sectors 78 in engagement therewith, which sectors are fast upon a shaft 79. The shaft 79 is provided with a crank arm 80 to which is pivotally secured at 81 one end of a pitman 82, the other end thereof being forked as at 83 and being in engagement with either side of the shaft 6 whereby said pitman is guided in its movements. The said pitman is provided with a pin 84 which runs in a cam race in the cam disk 9, said race being similar to the race 69 of the cam disk 7.

From the above construction it follows that motion imparted to the pitman 82 will be transmitted to the reciprocating racks 76 and cause them to move upward along inclined and converging lines.

It was shown above how a group of can body blanks would be fed to a pair of folding wings 28 and left clamped between the upper surface of a link 16 and the lower surface of the forming horn 31. As soon as the feed members 56 have moved away from the pair of folding wings to which they have supplied blanks and while the blanks are still clamped between the link 16 and horn 31, the mechanism last above described is operated; whereupon the cam faces 77 of the inclined racks 76 will engage the wings 28 and fold or swing them upward about their hinges, thereby bending the blanks which they carry about the forming horn. This operation will be understood from Figs. 5, 6, and 7 wherein the operation of the mechanism for folding the wings 28 is illustrated.

After the wings 28 have been folded closely about the horn 31 into the position shown in Fig. 3 and in dotted lines in Fig. 5, and after the can bodies have been released by a downward movement of the sprocket wheel 19 and of the link 16 of the movable carrier by which they have been held against the horn 31, the movable carrier is moved toward the right in one of its step by step movements, the wings sliding past the racks 76 which are maintained in contact therewith. Before the end of this movement the wings will have been carried into a position between the first pair of a series of guide rolls 85 supported by brackets 86 secured to the table 73. Soon after the wings 28 have entered between the first pair of guide rolls, so that the said rolls will keep the wings closed, the inclined racks 76 are moved downward to be out of the way when a second pair of wings is to advance to receive a second group of blanks. The wings 28 are kept closed or folded by the guide rolls 85 during the rest of the movement of the can bodies along the forming horn 31, and until the can bodies are completed.

The can body blanks as they are fed through the machine are engaged by the spurs or projections 36 and 38, and it will be understood that as these are merely for the purpose of moving the blanks they need to project but slightly, and that the links 16 are raised enough to permit the spurs 38 to swing over the upper surface of the horn 31. As the said link returns to its lowermost position the spurs 38 enter into and afterward move along the grooves 33 in the horn 31. As the wings 28 are folded the cheek pieces 35 bend the sides of the can bodies inward, as seen in Fig. 7, for the purpose of securing a can body which when finished will have straight sides. The sides of the finished can body would bulge outwardly were it not for this feature. The cheek pieces 35 move along the depressions 34 in the sides of the horn as the can bodies pass through the machine. One of the ends of each of the can body blanks is coated with solder before they are supplied to my machine, and the blanks having been bent into proper form as above disclosed, and while they are held in shape with their ends overlapping by the wings aforesaid, the said ends are soldered together to complete the formation of the can body by mechanism as follows: 87 is a hot soldering die heated by gas supplied through the pipe 88, and 89 is a cold die through which water is circulated by the pipes 90, 91. These dies are carried by yokes 92, 92 which are pivotally supported at one end in suitable bearings at 93. These dies are swung on the pivotal point 93, so as to engage the cans and to release them when they are to be moved forward a step, by means of racks 94 at the free end of each of the yokes 92, which racks are in engagement with pinions 95 formed in or secured to the shaft 96 which is supported in suitable bearings 97. 98 is a toothed sector fast upon the shaft 96, with which sector a rack, which is formed on a continuation of the rack bar 68, engages, as will be understood from Figs. 3 and 4. The dies 87 and 89 are reduced to a narrow projection 99 at their lower ends, and it will be understood that there is sufficient space between the ends of the wings 28 when closed to permit this projection to pass between said ends and engage the overlapping ends of the can body blank.

From the above it will be seen that as the above mentioned hot and cold dies are drawn down upon a series of cans passing through the machine the hot die will melt the solder upon the overlapping ends of the can body blanks, and the cold die will press the ends together and cool the joint, the ends being held together until the solder sets. It will of course be understood that the dies are lifted and the movable carrier moved forward a step between the above enumerated heating and cooling operations.

100 is a rod extending from the horn 31 and which supports the finished can bodies after they leave the horn.

The sprocket wheels 18 and 19 are provided with notches 101 which engage cross rods or projections 102 of the links 16 to drive the movable carrier, each of said links being recessed on its under side as at 103, all as seen in Fig. 9.

Having thus described my invention, and explained the mode of operation thereof, I claim and desire to secure by Letters Patent:—

1. In a can making machine, an endless carrier comprising a series of links; a pair of wings hinged to each of said links; means for operating said carrier in a series of step by step movements; a forming horn adjacent and parallel with which said carrier passes; means for feeding blanks to each of said pairs of wings in succession; intermittently operating means acting upon each successive link to thereby move them in succession toward said horn, to thereby temporarily clamp said blanks between said horn and said links; and intermittently operative means for folding each of said pairs of wings and the blanks about said horn while the blanks are held against said horn; and means for folding said wings and blanks about said horn.

2. In a can making machine, an endless carrier comprising a series of links, a pair of wings hinged to each of said links; means for operating said carrier in a series of step by step movements; a forming horn adjacent and parallel with which said carrier passes; means for feeding blanks to each of said pairs of wings in succession; intermittently operating means acting upon each successive link to thereby move them in succession toward said horn, to thereby temporarily clamp said blanks between said horn and said links; and intermittently operative means for folding each of said pairs of wings and the blanks about said horn while the blanks are held against said horn; means for folding said wings and blanks about said horn; soldering mechanism; and means for maintaining said wings folded about said horn during the soldering operation.

3. In a can making machine, an endless carrier comprising a series of links; a pair of wings hinged to each of said links; sprocket wheels about which said carrier passes; means for rotating one of said sprocket wheels to thereby drive said carrier; a forming horn beneath which said carrier passes; means for feeding blanks to each of said pairs of wings in succession; means for intermittently moving said second sprocket wheel toward said horn to thereby clamp said blanks between said links and said horn; and means for folding said wings and blanks about said horn.

4. In a can making machine, an endless carrier comprising a series of links; a pair of wings hinged to each of said links; sprocket wheels about which said carrier passes; means for imparting intermittent rotary motion to one of said sprocket wheels to thereby drive said carrier; a forming horn beneath which said carrier passes; means for feeding blanks to each of said pairs of wings in succession; means for moving each of said links toward said horn to thereby press said blanks against said horn; a pair of reciprocating racks for engaging said wings to fold them and said blanks about said horn; a shaft; a pair of gears upon said shaft and engaging said racks; and means for oscillating said shaft to thereby reciprocate said racks.

5. In a can making machine, an endless carrier comprising a series of links; a pair of wings hinged to each of said links; sprocket wheels about which said carrier passes; means for imparting intermittent rotary motion to one of said sprocket wheels to thereby drive said carrier; a forming horn beneath which said carrier passes; means for feeding blanks to each of said pairs of wings in succession; means for moving each of said links toward said horn to thereby press said blanks against said horn; a pair of reciprocating racks for engaging said wings to fold them and said blanks about said horn; a shaft; a pair of gears upon said shaft and engaging said racks; means for oscillating said shaft to thereby reciprocate said racks; means for maintaining said wings closed about said horn after they have been folded by said racks as aforesaid; and means for soldering the ends of said blanks together while held in position by said wings.

6. In a can making machine, an endless carrier comprising a series of links; a pair of wings hinged to each of said links; sprocket wheels about which said carrier passes; means for imparting intermittent rotary motion to one of said sprocket wheels to thereby drive said carrier; a forming horn beneath which said carrier passes; means for feeding blanks to each of said pairs of wings in succession; means for moving each of said links toward said horn to thereby press said blanks against said horn; a pair of reciprocating racks for engaging said wings to fold them and said blanks about said horn; a shaft; a pair of gears upon said shaft and engaging said racks; means for oscillating said shaft to thereby reciprocate said racks; means for maintaining said wings closed about said horn after they have been folded by said racks as aforesaid and during said soldering operation; means for heating the ends of said blanks; and means for thereafter cooling the ends of said blanks.

7. In a can making machine, an endless carrier comprising a series of links; a pair of wings hinged to each of said links; means for operating said carrier in a series of step by step movements; a forming horn beneath which said carrier passes; means for feeding blanks to each of said pairs of wings in succession; means for folding said wings and blanks about said horn; a series of guide rolls adapted to engage said wings to keep them closed about said horn; a reciprocating heated die adapted to engage the ends of said blanks to solder them together; a reciprocating cooling die adapted to engage the seam thus formed; and means for operating said dies in unison.

8. In a can making machine, an endless carrier comprising a series of links; a pair of wings hinged to each of said links; means for operating said carrier in a series of step by step movements; a forming horn beneath which said carrier passes; means for feeding blanks to each of said pairs of wings in succession; means for folding said wings and blanks about said horn; means for maintaining said wings closed about said horn during the soldering operation; a reciprocating heated die adapted to engage the ends of said blanks to solder them together; a reciprocating cooling die adapted to engage the seam thus formed; and means for operating said dies in unison.

9. In a can making machine, an endless carrier comprising a series of movable blank folders, a forming horn, means for operating the blank folders, and intermittently operating means for clamping each of said blanks between a part of its folder and the horn before and during the folding process.

10. In a can making machine; an endless carrier; means for operating said carrier; a forming horn beneath which said carrier passes; means for feeding blanks to said carrier intermittently as said carrier is advanced; means for intermittently moving a portion of said carrier toward said horn to thereby press said blanks against said horn; means for folding said blanks about said horn; and means for soldering the ends of said blanks together.

11. In a can making machine, an endless carrier; means for operating said carrier; a forming horn beneath which said carrier passes; means for intermittently feeding groups each comprising a plurality of blanks to said carrier as said carrier is advanced; means for folding said successive groups of blanks about said horn at a single operation; and means for soldering the ends of said blanks together.

12. In a can making machine, an endless carrier comprising a series of links; a pair of wings hinged to each of said links; means for operating said carrier in a series of step by step movements; a forming horn beneath which said carrier passes; means for feeding a plurality of blanks to each of said pairs of wings as said carrier is advanced; means for moving each of said links toward said horn to thereby press said blanks against said horn; means for folding said wings and blanks about said horn; a reciprocating heated die adapted to simultaneously engage the ends of the blanks carried by each pair of wings; a reciprocating cooling die adapted to simultaneously engage the joints thus formed; and means for operating said dies.

13. In a can making machine, a forming horn; an endless carrier extending beneath said horn; sprocket wheels about which said carrier passes; means for rotating one of said sprocket wheels to thereby drive said carrier; a shaft upon which said second sprocket wheel is supported and upon which it is free to turn; bearings for said shaft and disposed eccentrically thereto; and means for oscillating said shaft upon said bearings to thereby move said second sprocket wheel toward and from said forming horn.

14. In a can making machine, a forming horn; an endless carrier extending beneath said horn; sprocket wheels about which said carrier passes; means for intermittently rotating one of said sprocket wheels to thereby drive said carrier in a series of step by step movements; a shaft upon which said second sprocket wheel is supported and upon which it is free to turn; bearings for said shaft and disposed eccentrically thereto; and means for oscillating said shaft upon said bearings to thereby move said second shaft toward and from said forming horn.

15. In a can making machine, a forming horn; an endless carrier extending beneath said horn; sprocket wheels about which said carrier passes; means for intermittently rotating one of said sprocket wheels to thereby drive said carrier in a series of step by step movements; a shaft upon which said second sprocket wheel is supported and upon which it is free to turn; bearings for said shaft and disposed eccentrically thereto; a geared sector carried by said shaft; a rack in engagement with said sector; and means for reciprocating said rack, whereby said shaft may be oscillated upon its bearings and movement toward and from said horn imparted to said second sprocket wheel.

16. In a can making machine, a table; a forming horn extending above said table; a carrier comprising a pair of wings adapted to move between said table and said horn; means for feeding blanks to said wings; means for folding said wings and blanks about said horn; a series of pairs of rolls supported by said table and between which said wings pass and whereby they are maintained folded about said horn; a support located at one side of said table; a yoke extending transversely of said horn and pivotally supported by said support; a heated die carried by said yoke and adapted to engage the ends of said blanks to solder them together; a second support located at one side of said table; a yoke extending transversely of said horn and pivotally supported by said second support; a cooling die carried by said yoke and adapted to engage the joint as formed above to cool it; and means for operating said yokes.

17. In a can making machine, a table; a forming horn extending above said table; a carrier comprising a pair of wings adapted to move between said table and said horn; means for feeding blanks to said wings; means for folding said wings and blanks about said horn; a series of pairs of rolls supported by said table and between which said wings pass and whereby they are maintained folded about said horn; a support located at one side of said table; a yoke extending transversely of said horn and pivotally supported by said support; a heated die carried by said yoke and adapted to engage the ends of said blanks to solder them together; a second support located at one side of said table; a yoke extending transversely of said horn and pivotally supported by said second support; a cooling die carried by said yoke and adapted to engage the joint as formed above to cool it; racks carried by the free ends of said yokes; a shaft; pinions upon said shaft in engagement with said racks; and means for oscillating said shaft to thereby swing said yokes about their pivotal supports.

This specification signed and witnessed this 30th day of December A. D. 1907.

CHARLES W. SLEEPER.

In the presence of—
GEO. N. KENT,
NELLIE L. GOODALE.